US008628201B2

(12) United States Patent
Liang et al.

(10) Patent No.: US 8,628,201 B2
(45) Date of Patent: Jan. 14, 2014

(54) FLASH DEVICE STRUCTURE

(75) Inventors: Chih-Chung Liang, New Taipei (TW);
Hung-Yu Chen, New Taipei (TW);
Pei-Jen Lin, New Taipei (TW);
Chia-Lan Cheng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 306 days.

(21) Appl. No.: 13/235,356

(22) Filed: Sep. 17, 2011

(65) Prior Publication Data
US 2012/0212927 A1 Aug. 23, 2012

(30) Foreign Application Priority Data

Feb. 22, 2011 (TW) .............................. 100105880 A

(51) Int. Cl.
*G03B 15/02* (2006.01)
(52) U.S. Cl.
USPC ...................................... 362/16; 362/3; 362/8
(58) Field of Classification Search
USPC ................... 362/3, 8, 16, 257, 217.1, 217.11, 362/217.12, 217.13, 217.14, 217.15, 362/217.16, 217.17; 396/176, 200
See application file for complete search history.

(56) References Cited

U.S. PATENT DOCUMENTS

| 5,727,861 A * | 3/1998 | Motohashi ............... 362/217.15 |
| 2001/0033745 A1 | 10/2001 | Nakagawa |
| 2005/0117318 A1 | 6/2005 | Tenmyo |
| 2010/0061075 A1* | 3/2010 | Huang et al. .................... 362/16 |
| 2011/0194291 A1* | 8/2011 | Kobayashi ....................... 362/3 |

FOREIGN PATENT DOCUMENTS

| CN | 101673024 A | 3/2010 |
| JP | 56-14276 A | 2/1981 |
| JP | 2004-354801 A | 12/2004 |
| TW | 200730909 A | 8/2007 |
| TW | 200807182 A | 2/2008 |
| TW | 201013295 A | 4/2010 |
| WO | WO 2010/047156 A1 * | 4/2010 |

* cited by examiner

*Primary Examiner* — Y My Quach Lee
(74) *Attorney, Agent, or Firm* — Altis Law Group, Inc.

(57) ABSTRACT

A flash device structure comprises a front window mechanism and a fixing seat. The front window mechanism has a base, a luminous module and a placement element, wherein the luminous module is set up on the placement element to be located inside the base and maintain the luminous module electrically connected. The fixing seat includes a trigger, wherein the trigger electrically connects with the luminous module when the fixing seat is connected into the front window mechanism.

8 Claims, 6 Drawing Sheets

FLASH DEVICE STRUCTURE

BACKGROUND

1. Technical Field

The present disclosure generally relates to flash devices, and particularly to a flash device structure.

2. Description of the Related Art

A common flash device is used mostly for photographic purposes but is also employed in scientific, medical and industrial applications. The common flash device has many components, such as a flashtube which is an electric arc lamp designed to produce extremely intense, incoherent, full-spectrum white light for very short duration. However, the common flash device is hard to assemble and even harder to miniaturize because of the volume of each component of the common flash device. In addition, the structure of the common flash device is bulky. It is not convenient to assemble and maintain.

Therefore, it is desirable to provide a flash device structure which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the flash device structure. Moreover, in the drawings, like reference numerals designate corresponding parts throughout the views.

DETAILED DESCRIPTION

Embodiments of a flash device structure as disclosed are described in detail here with reference to the drawings.

Figure 1:
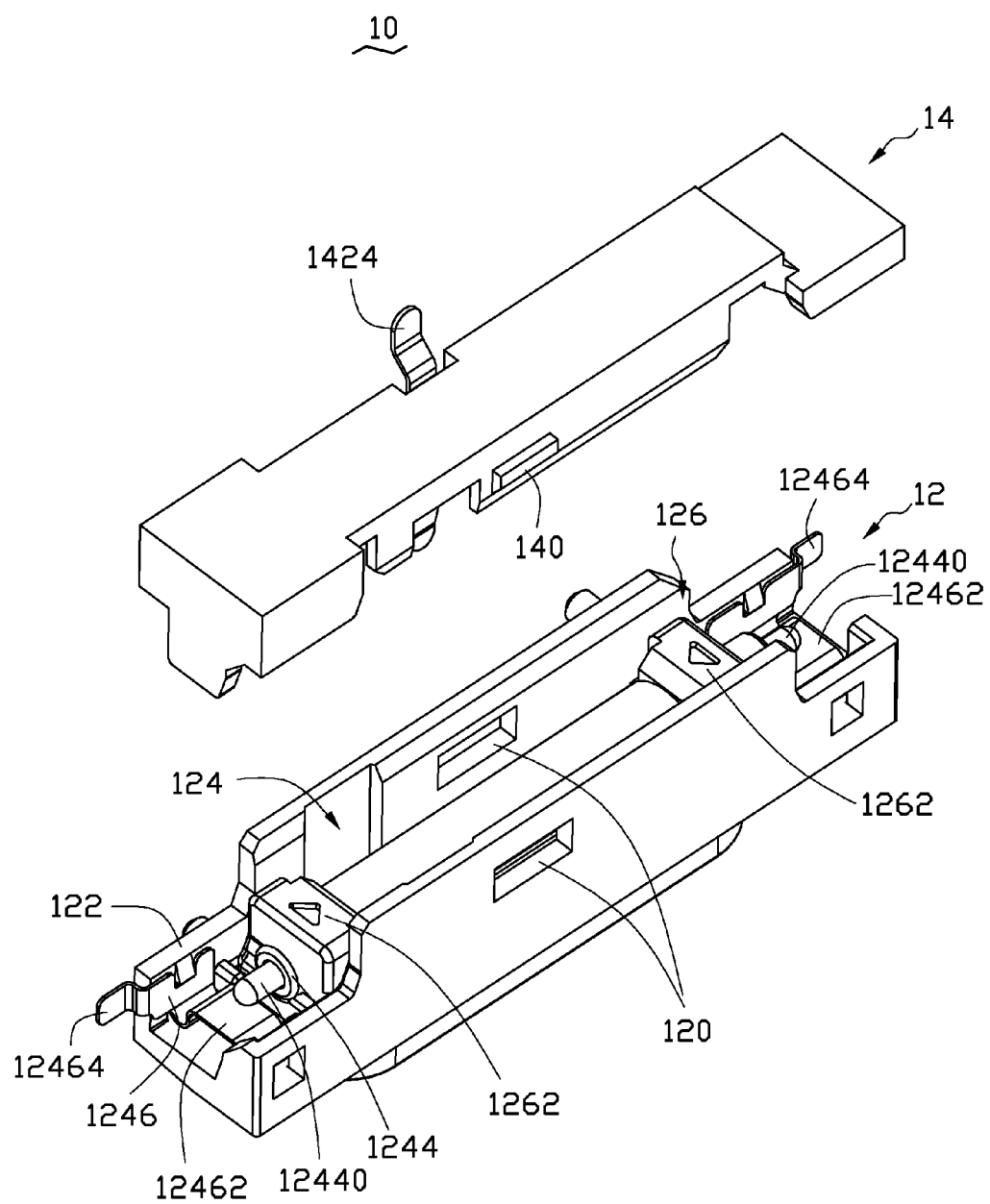
FIG. 1 is an exploded view of a flash device structure in accordance with a first embodiment.

Referring to FIG. 1, a flash device structure 10 in accordance with a first embodiment includes a front window mechanism 12, and a fixing seat 14. The front window mechanism 12 and the fixing seat 14 are directly assembled. The front window mechanism 12 has two fixing holes 120. The fixing seat 14 corresponding to each of the fixing holes 120 has an elastic protrusion 140. The elastic protrusion 140 is secured into the fixing holes 120. Thus, the front window mechanism 12 is connected to the fixing seat 14.

Figure 2:
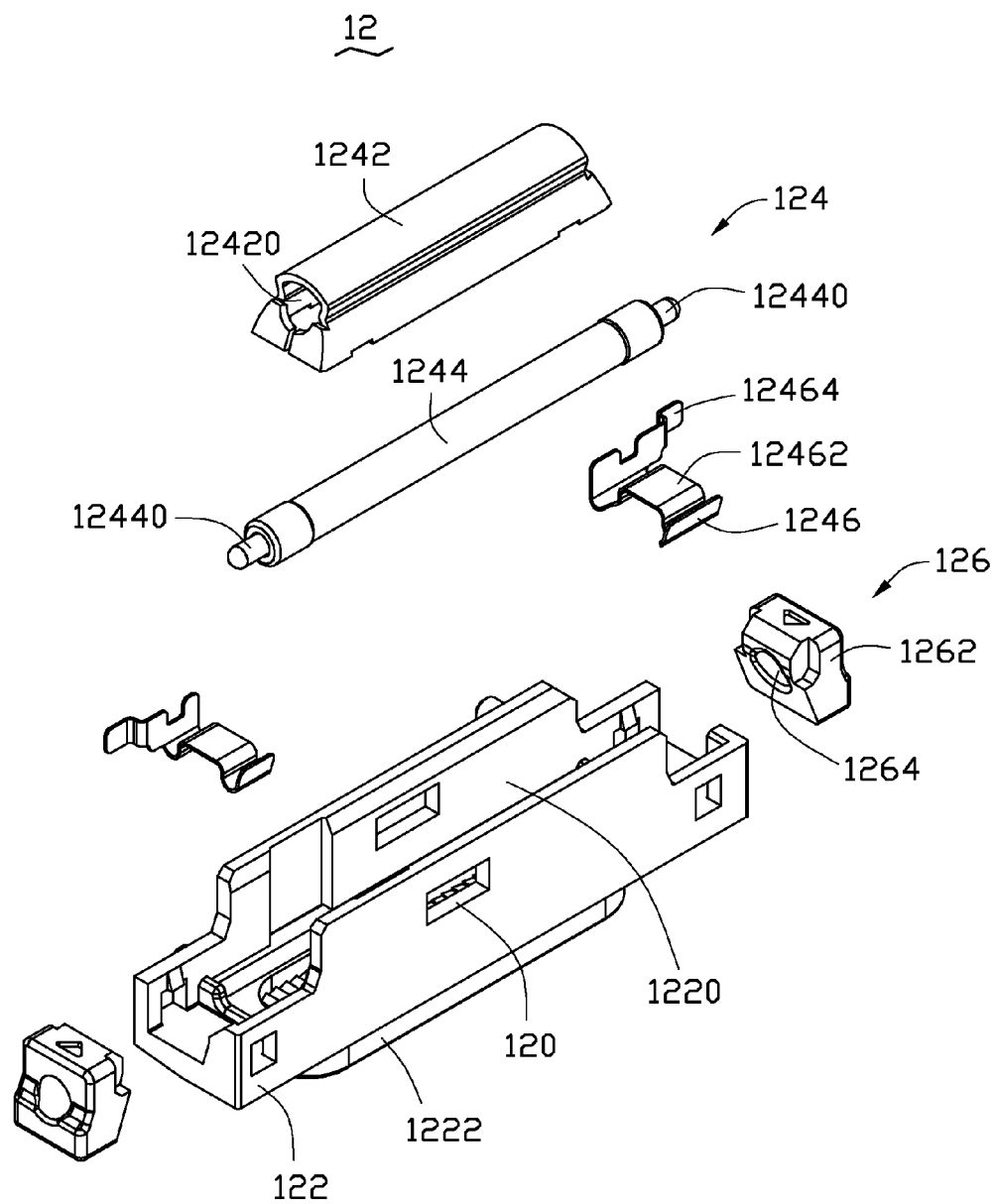
FIG. 2 is an exploded view of a front window mechanism of the flash device structure of FIG. 1.

Referring to FIG. 2, the windows mechanism 12 has a base 122, a luminous module 124, and a placement element 126. The base 122 has a channel 1220 having a width. Two ends of the channel 1220 are lower than a center of the channel 1220. A front window 1222 is defined in the bottom of the channel 1220. Light from the luminous module 124 travels through the front window 1222. The luminous module 124 includes a reflector 1242, a flashtube 1244, and two securing tubes 1246. A longitudinal through hole 12420 is defined in the reflector 1242. The flashtube 1244 passes through the through hole 12420. Thus, a center of the luminous area of the flashtube 1244 is located inside the reflector 1242.

Two electrodes at two ends of the flashtube 1244, respectively, are arranged at two sides of the reflector 1242. The securing tube 1246 has an embedded seat 12462, and a connecting piece 12464. A width of the embedded seat 12462 is corresponding to that of the channel 1220 of the base 122. Thus, the securing tubes 1246 are securely arranged at the two ends of the channel 1220 by the embedded seats 12462. Moreover, the connecting pieces 12464 protrude outwards from the channel 1220. The placement element 126 has two placement blocks 1262. A placement hole 1264 is defined in each of the placement blocks 1262 passing through the placement blocks 1262. A width of the placement blocks 1262 is corresponding to that of the channel 1220. Each of the placement blocks 1262 is securely arranged into the channel 1220. The placement holes 1264 defined in each of the placement blocks 1262 of two placement blocks 1262 are at the same height.

An internal diameter of the placement holes 1264 defined in each of the placement blocks 1262 of the two placement blocks 1262 is corresponding to an external diameter of the flashtube 1244. Thus, the placement blocks 1262 are arranged at the two sides of the reflector 1242. A material of the placement blocks 1262 is rubber. When the placement blocks 1262 are inside the channel 1220, the luminous module 124 is securely fixed inside the base 122 by the restriction of the combination of the flashtube 1244 and the reflector 1242. Therefore, the luminous module 124 is exposed through the front window 1222.

Figure 3:
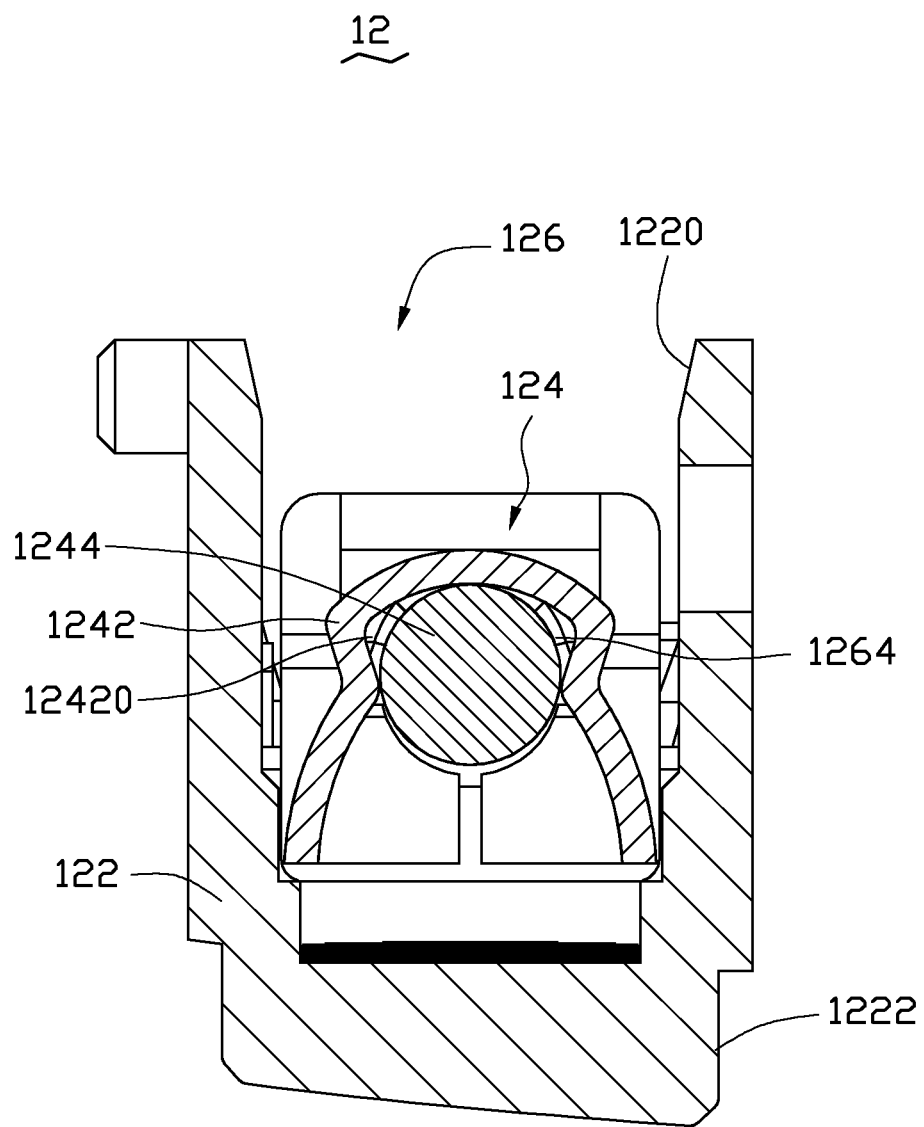
FIG. 3 is a cross sectional view of the front window mechanism of the flash device structure of FIG. 1.

Referring to FIG. 3, the placement blocks 1262 passes through the flashtube 1244. The placement blocks 1262 of the front window mechanism 12 are arranged at the two sides of the reflector 1242 and are connected into the base 122. This restricts the relatively position of the reflector 1242 and the flashtube 1244. The placement blocks 1262 restrict the flashtube 1244 to be substantially level. Thus, the electrodes 12440 of two ends of the flashtube 1244 electrically connect to the securing tubes 1246 of the embedded seat 12462 (as shown in FIG. 1). The reflector 1242, the flashtube 1244, and the securing tubes 1246 of the luminous module 124 are securely fixed inside the channel 1220 with the placement blocks 1262. Thus, the electrically structure of the luminous module 124 is stable.

Figure 4:
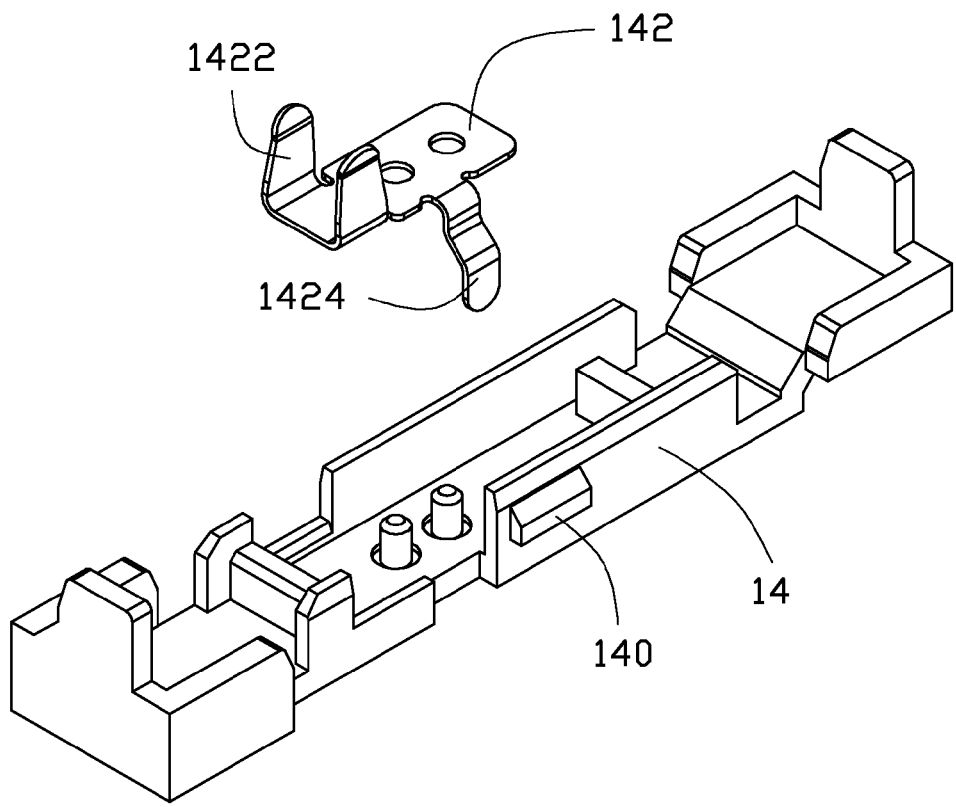
FIG. 4 is an exploded view of a fixing seat of the flash device structure of FIG. 1.
Figure 5:
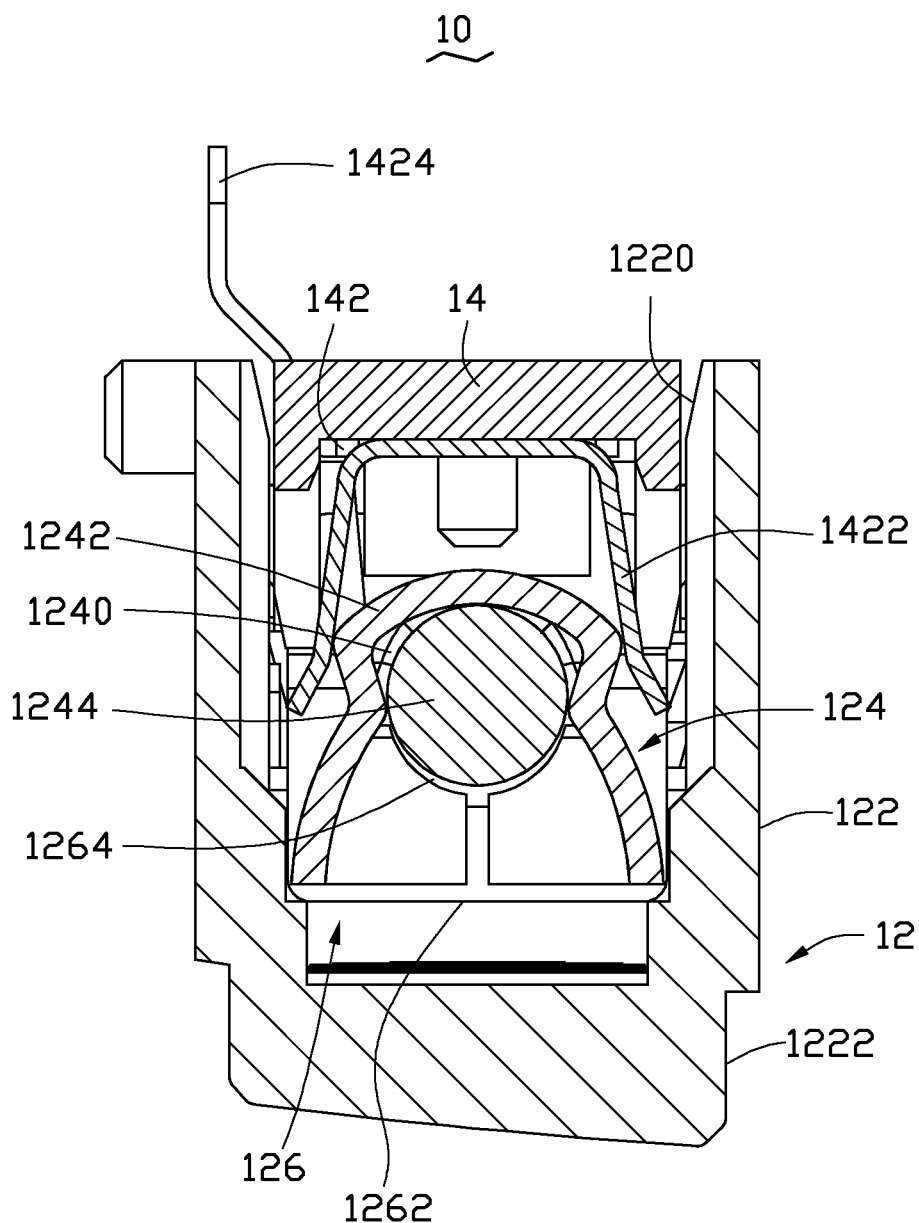
FIG. 5 is a cross sectional view of the flash device structure of FIG. 1.

Referring to FIG. 4, the fixing seat 14 has a trigger 142 arranged inside. The trigger 142 has a guide piece 1422, and a connecting piece 1424 (as shown in FIG. 1). An opening of the guide piece 1422 faces the inside of the fixing seat 14. The connecting piece 1424 faces an outside of the fixing seat 14. Referring to FIG. 5, when the fixing seat 14 is connected to the front windows 12, the opening of the guide piece 1422 electrically connects the reflector 1242. The guide piece 1422 contacts the reflector 1242 using pressure. Thus, the reflector 1242 securely contacts the flashtube 1244. Therefore, the electrically connection structure of the luminous module 124 is stable.

Figure 6:
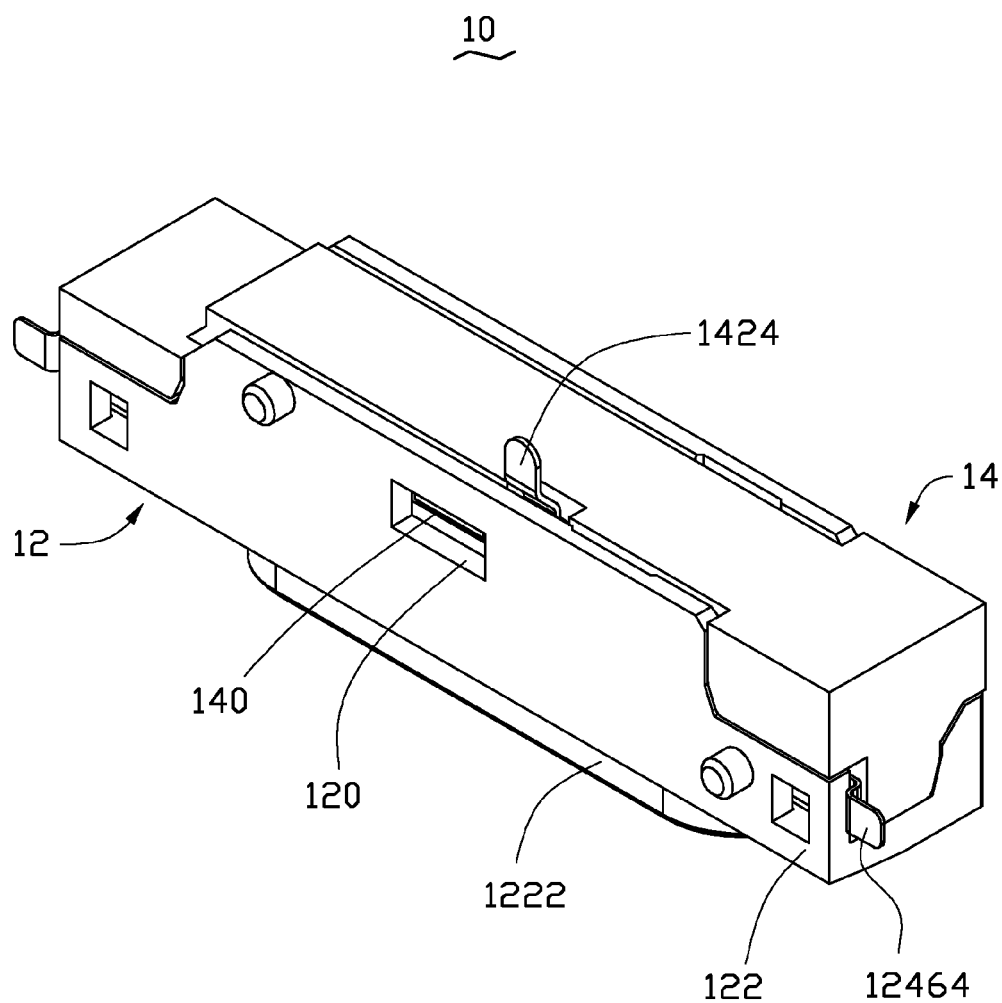
FIG. 6 is a schematic view of the flash device structure of FIG. 1 in use.

Referring to FIG. 6, the connecting piece 12464 of the luminous module 124 at the two ends of the flash device structure 10 and the connecting piece 1424 of the trigger 142 directly electrically connect to the circuit board (not shown).

It is convenient for assembling the flash device structure 10. A space of the flash device structure 10 is reduced by the placement element 126.

It is to be understood, however, that even though numerous characteristics and advantages of the disclosure have been set forth in the foregoing description, together with details of the structures and functions of the embodiment(s), the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A flash device structure comprising:
a front window mechanism including a base, a luminous module, and at least one placement element; wherein the luminous module is fixed to the placement element, and together positioned inside the base, the luminous module includes a reflector, a flashtube, and two securing tubes, the reflector has a through hole, the flashtube passing through the through hole, a luminous area of a center of the flashtube is inside the reflector, and two electrodes of the flashtube protrudes outwards two ends of the reflector; and
a fixing seat including a trigger, wherein the trigger electrically connect with the luminous module when the fixing seat is connected to the front window mechanism, the triggers have a guiding piece and a connecting piece, an opening of the guiding piece faces the inside of the fixing seat, the connecting piece and the guiding piece are oppositely arranged, and the connecting piece faces the outside of the fixing seat, the guiding piece presses the reflector, and the reflector contacts the flashtube.

2. The flash device structure of claim 1, wherein the fixing seat is connected to the front window apparatus, the front window mechanism has two fixing holes, and the fixing seat has two elastic protrusions, each of the elastic protrusion corresponds to one of the fixing holes.

3. The flash device structure of claim 2, wherein the base has a channel having a width, and a front window is arranged at the bottom of the channel.

4. The flash device structure of claim 3, wherein each of the securing tubes has an embedded seat, and a connecting piece, a width of the embedded seat is corresponding to that of the channel of the base, the securing tubes are securely arranged at two ends of the channel by the embedded seat, and the connecting pieces protrude outwards the two ends of the channel.

5. The flash device structure of claim 4, wherein the placement element has two placement blocks, a placement hole is defined in each of the placement blocks passing through the placement blocks, an internal diameter of the placement hole defined in each of the placement blocks is corresponding to an external diameter of the flashtube, and a width of the placement blocks is corresponding to that of the channel of the base.

6. The flash device structure of claim 5, wherein the placement hole defined in each of the placement blocks are at the same height, the placement blocks passing through the flashtube and arranged at the two sides of the reflector are connected into the base, and the relative position of the reflector and the flashtube is restricted.

7. The flash device structure of claim 6, wherein the placement blocks restrict the flashtube at the same height, the two electrodes of the flashtube electrically connects to the securing tubes of the embedded seat.

8. The flash device structure of claim 5, wherein a material of the placement blocks is rubber.

* * * * *